United States Patent [19]

Korte, Jr.

[11] 4,066,945
[45] Jan. 3, 1978

[54] LINEAR DRIVING CIRCUIT FOR A D.C. MOTOR WITH CURRENT FEEDBACK

[75] Inventor: Donald R. Korte, Jr., Pompano Beach, Fla.

[73] Assignee: The Bendix Corporation, Southfield, Mich.

[21] Appl. No.: 672,106

[22] Filed: Mar. 31, 1976

[51] Int. Cl.² .............................................. G05F 1/08
[52] U.S. Cl. ..................... 318/681; 318/678; 318/599
[58] Field of Search ............... 318/678, 681; 323/75 E; 321/27

[56] References Cited
U.S. PATENT DOCUMENTS

| | | | |
|---|---|---|---|
| 3,471,759 | 10/1969 | Broverman | 318/681 |
| 3,525,029 | 8/1970 | Joslyn et al. | 318/599 |
| 3,652,913 | 3/1972 | Leland | 318/678 |

Primary Examiner—Robert K. Schaefer
Assistant Examiner—John J. Feldhaus
Attorney, Agent, or Firm—W. G. Christoforo; Bruce L. Lamb

[57] ABSTRACT

A linear driving circuit includes a full bridge drive circuit across which a d.c. motor is connected. Each side of the bridge circuit is controlled by an associated complementary transistor loop, each of which is in turn controlled by an associated control operational amplifier. Each control operational amplifier is referred at one-half the voltage across the bridge circuit by a common voltage divider. The currents through each half of the bridge circuit are compared to provide current feedback.

6 Claims, 1 Drawing Figure

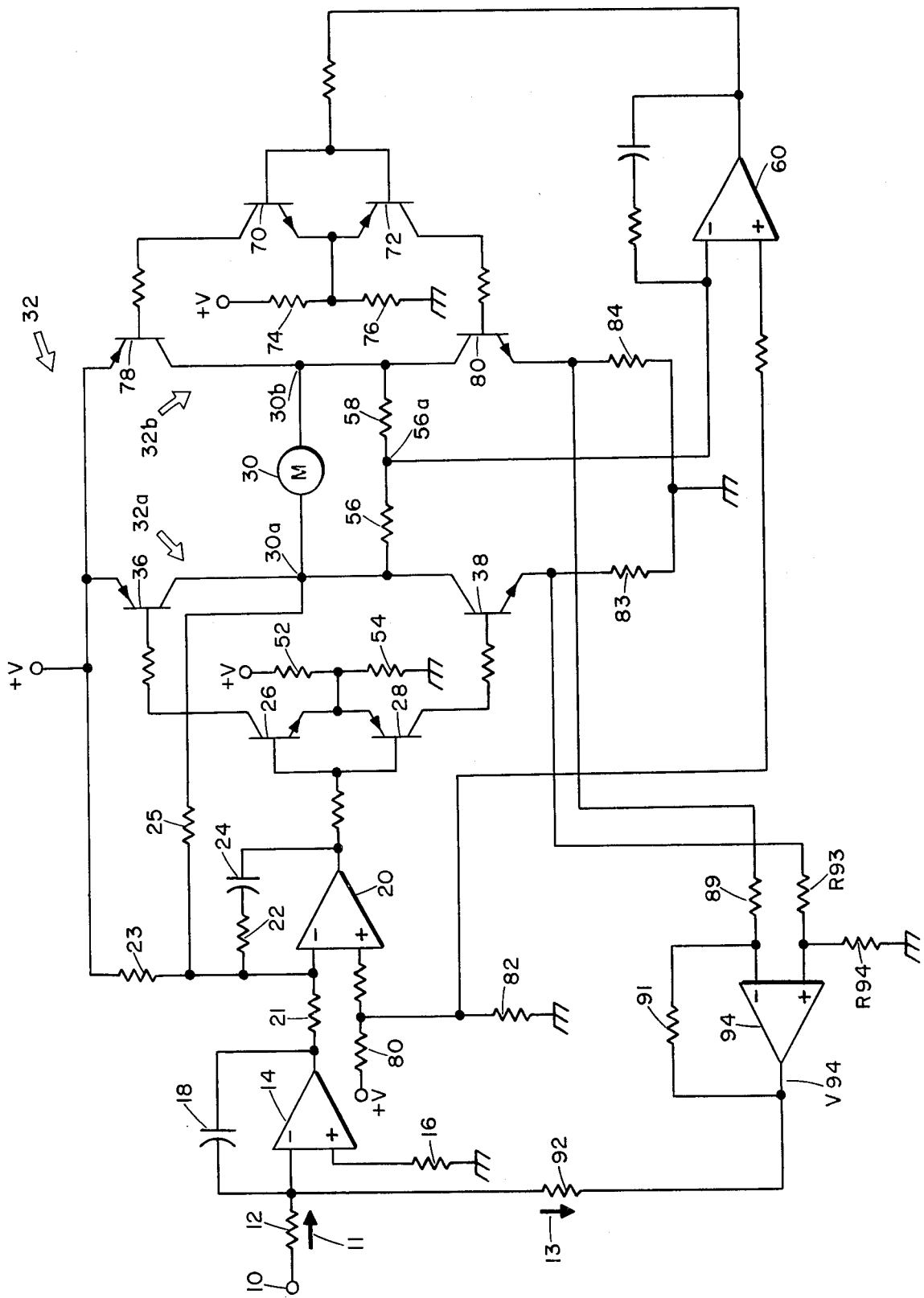

LINEAR DRIVING CIRCUIT FOR A D.C. MOTOR WITH CURRENT FEEDBACK

BACKGROUND OF THE INVENTION

This invention relates to drive circuits for d.c. motors and more particularly to such drive circuits which provide for linear motor response to a command signal. The embodiment of the invention illustrated herein is adapted for use in an aircraft autopilot system wherein the motor, in response to electrical commands from an autopilot logic circuit, positions the aircraft control surfaces. Other uses of the invention will also suggest themselves to one skilled in the art.

It is standard practice to power d.c. torquer autopilot servomotors which position the aircraft control surfaces in the aircraft flight control systems from the aircraft primary d.c. voltage supply. The need for reversible servomotors in such systems suggests that a bridge motor drive circuit be used. In these systems the d.c. servomotor is connected across interior points of the bridge and the aircraft primary d.c. voltage supply is connected across the bridge. The bridge, under present practice, is comprised of active power elements such as power transistors. It is highly desirable that the bridge and its associated control elements be designed to prevent both sides of the bridge from turning on to destroy the power transistors.

The present invention provides a drive circuit for d.c. servomotors which completely eliminates the aforementioned self-destructive mode of operation and further provides for direct control of servomotor current and thus direct control of motor torque. This is accomplished by providing a differential voltage across the motor, by means of a full transistor bridge. Each side of the bridge is controlled by an associated operational amplifier, both of which are referred to the same reference voltage, which is one-half the voltage across the bridge, by means of a voltage divider which is common to both operational amplifiers. A first of the operational amplifiers drives one side of the bridge in response to an input motor control signal, while the other operational amplifier drives the other side of the bridge in response to the voltage developed across the motor and, in effect, provides a feedback command. Since both operational amplifiers are referenced to the same voltage there will be no quiescent voltage difference across the motor.

A current drive loop includes a comparator which provides an input current command signal which is a direct torque command to the motor and responds to the difference between the currents in the various sides of the bridge and the input motor command signal.

The FIGURE is a schematic of an embodiment of the invention.

DESCRIPTION OF THE PREFERRED EMBODIMENT

Referring to the FIGURE, an input motor command signal suitably comprised of a current 11 obtained from the logic circuits of an aircraft autopilot and intended to drive motor 30, which in turn positions an aircraft control surface, is impressed into an input terminal 10 and applied through resistor 12 toward the inverting input terminal of operational amplifier 14 whose non-inverting input terminal is connected through resistor 16 to a reference voltage, here illustrated as ground. Operational amplifier 14 is connected as an integrator, a capacitor 18 being connected between its inverting input terminal and its output terminal so as to assure zero static error between the current command signal 11 and a current feedback signal 13, to be described below.

The aforementioned output terminal is resistively connected through resistor 21 to the inverting input terminal of first control operational amplifier 20 which is an integrator with lead compensation, resistor 22 and capacitor 24 being connected between its inverting input terminal and its output terminal. Feedback is provided through resistor 25 from one side 30a of motor 30 to the inverting input terminal. The output signal from operational amplifier 20 is resistively coupled into the base electrodes of complementary transistors 26 and 28, which together comprise a control amplifier for one side 32a of bridge 32, the collector electrode of NPN transistor 26 being resistively connected to the base electrode of PNP bridge transistor 36 and the collector electrode of PNP transistor 28 being resistively connected to the base electrode of NPN bridge transistor 38. The commonly connected emitter electrodes of transistors 26 and 28 are referenced to a voltage which is one-half the voltage across bridge 32 by means of the voltage divider comprised of identical resistors 52 and 54 which are serially connected between the +V voltage terminal and ground.

A second voltage divider comprised of identical resistors 56 and 58 is serially connected between motor terminals 30a and 30b and produces a signal at midpoint 56a thereof which is equal to the average of the voltage levels at terminals 30a and 30b. Terminal 56a comprises the inverting input terminal of a second control operational amplifier 60 which is connected, like operational amplifier 20, as an integrator with lead compensation. Both of these operational amplifiers are referenced at their non-inverting input terminals to the same voltage, which is equal to V/2, by the common voltage divider comprised of identical resistors 80 and 82 which are serially connected between the +V voltage terminal and ground. Operational amplifier 60 controls the second side 32b of bridge 32 comprised of power transistors 78 and 80 through the complementary symmetry transistors 70 and 72, whose emitter electrodes are biased at V/2 by the voltage divider comprised of resistors 74 and 76. As can be seen, the two sides of bridge 32, sides 32a and 32b, together with their associated control elements, are essentially identical. This, together with the referencing of control operational amplifiers 20 and 60 to the same voltage produce identical quiescent voltages at points 30a and 30b equal to V/2.

Resistors 83 and 84, in the emitter circuits of transistors 38 and 80, respectively, sense the currents in each side, respectively, of bridge 32. The current in side 32a is sensed as a voltage and resistively coupled to the non-inverting input terminal of operational amplifier 94. The current in side 32b is sensed as a voltage and resistively coupled to the inverting input terminal of operational amplifier 94 which is connected as an inverting amplifier. The output terminal of operational amplifier 94 is coupled through resistor 92 to the inverting input terminal of amplifier 14.

In operation, operational amplifier 20 controls the voltage at point 30a. With no command signal at terminal 10, a virtual ground exists at the output terminal of operational amplifier 14 since resistor 21 is identical to resistor 23. Under these conditions no current can flow in resistor 25 so that V/2 must appear at terminal 30a. In addition, no current can flow in resistor 56 so that operational amplifier 60 forces V/2 to appear at terminal 30b. There is thus no current through motor 30.

Assume now that there is a command signal at terminal 10 in the form of a current in the direction of arrow 11. This will cause transistors 36 and 80 to be conductive so that current flows through motor 30 from terminal 30a and 30b. Current thus flows in resistor 84, which is very small compared to the sum of the resistances of resistors 89, 91 and 92. No current flows in resistor 83, which is of equal value with resistor 84, so that the voltage drop across resistor 84 must be equal to the voltage drop across the serial string of resistors 89, 91 and 92. Operational amplifier 94 converts this motor current that flows alternately through $R_{89}$ and $R_{82}$ to a bipolar voltage $V_{94}$ representative of motor torque as follows:

$$V_{94} = (I \text{ motor}/R_{84})(R_{91}/R_{89})$$

where $R_{xx}$ is the resistance of resistor $xx$ and $I_{motor}$ is the current through motor 30. Bi-directional linearity is maintained since $R_{84} = R_{82}$ and the ratio $R_{91}/R_{89} = R_{94}/R_{93}$. The feedback current $l_{13}$ is then equal to:

$$l_{13} = V_{94}/R_{92}.$$

Thus, $R_{92}$ can be made the value appropriate for the selected motor.

The motor current or torque will vary linearly with the command signal. In addition, assuming under these conditions the voltage at point 30a is:

$$V/2 + M$$

then the voltage at point 30b, due to the circuit including operational amplifier 60, must be:

$$V/2 - M$$

in order that the voltage at point 56a remain at V/2.

A similar result occurs when the command signal current is in a direction opposite to arrow 11 except that power transistors 78 and 38 are now conductive and power transistors 76 and 80 turned off so that current through motor 30 is now in an opposite direction than in the first example. The current amplification factor remains the same as in the above example and the voltage at point 30b moves up the same amount from V/2 as the voltage at point 30a moves down therefrom. Notice in particular that the mean voltage at the ends of motor 30 is always V/2 as the voltage supply +V varies. This assures that symmetrical power will be applied to the motor when the bridge saturates.

The invention claimed is:

1. A circuit for driving an electrical motor in response to a command signal comprising:
 a voltage source;
 a bridge circuit connected across said voltage source, said motor being connected between interior points of said bridge circuit, said bridge circuit including a first side comprising first and second controllable power transmission means and a second side comprising third and fourth controllable power transmission means;
 a voltage divider connected across said motor;
 first feedback means for generating a feedback signal related to the current flow through said motor;
 means for combining said feedback signal with said command signal to produce a control signal;
 first control means responsive to said control signal for controlling said first and second power transmission means;
 second feedback means connected between said bridge circuit and said first control means for controlling the voltage on one of the terminals of said motor; and,
 second control means responsive to the voltage at an interior point of said voltage divider for controlling said third and fourth power transmission means, wherein said first and second control means comprise first and second operational amplifiers respectively referenced to the same voltage whereby the quiescent voltage difference across said motor is zero.

2. The circuit for driving an electrical motor as recited in claim 1 wherein said same voltage is approximately equal to one-half the source voltage.

3. A circuit for driving a d.c. motor in response to a command signal comprising:
 a voltage source;
 a bridge circuit comprised of a first PNP transistor means having a first emitter connected to a first terminal of said voltage source and a first collector, a second NPN transistor means having a second emitter resistively connected to a second terminal of said voltage source and a second collector connected to said first collector and a first terminal of said motor, a third PNP transistor means having a third emitter connected to said first terminal of said voltage source and a third collector, and a fourth NPN transistor means having a fourth emitter resistively connected to said second terminal of said voltage source and a fourth collector connected to said third collector and a second terminal of said motor;
 a first operational amplifier means connected to control said first and second transistor means in a complementary symmetry mode and including a first input terminal connected to receive a control signal and additionally resistively connected to said first motor terminal and further resistively connected to said first voltage source terminal;
 a voltage divider having a midpoint and connected between said first and second motor terminals;
 a second operational amplifier means connected to control said third and fourth transistor means in a complementary symmetry mode and including a first input terminal means connected to said midpoint, second input terminals of said first and second operational amplifier means being referred to the same second voltage level; and
 a third operational amplifier means connected to sense the current flowing in said motor and responsive to said command signal for generating said control signal.

4. The circuit for driving a d.c. motor as recited in claim 3 wherein said third operational amplifier means comprises an integrator connected to receive said command signal and a signal related to current flow in said motor for providing an output signal resistively connected onto said first input terminal, said output signal comprising said control signal.

5. The circuit for driving d.c. motor as recited in claim 4 wherein said command signal comprises a current signal and said integrator comprises a fourth operational amplifier having a first input terminal connected to combine said command signal with said signal related to current flow in said motor, the output terminal of said third operational amplifier means being coupled to the first input terminal of said fourth operational amplifier.

6. The circuit for driving a d.c. motor recited in claim 3 wherein said second voltage level is about one-half the voltage of said voltage source.

* * * * *